Figure 1:
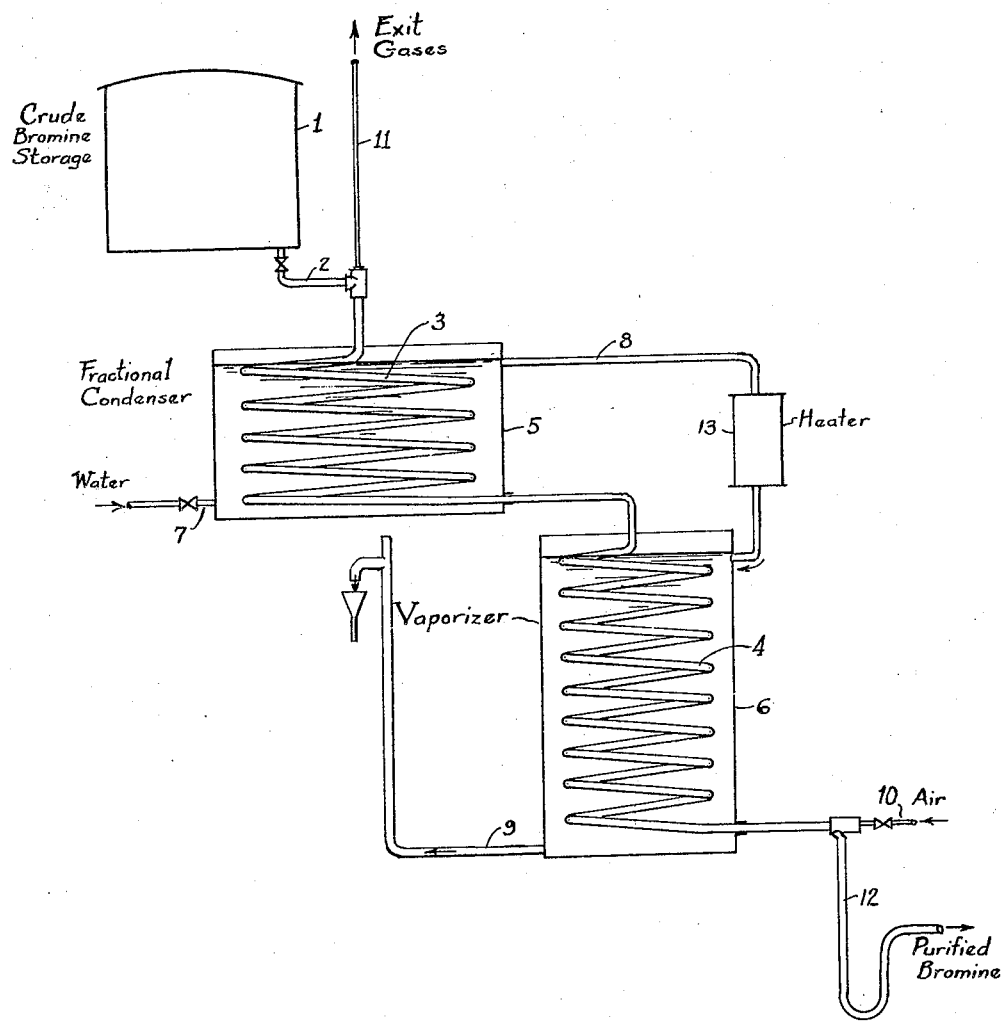

Patented Oct. 25, 1932

1,885,029

UNITED STATES PATENT OFFICE

GRAYTON F. DRESSEL, OF MIDLAND, MICHIGAN, ASSIGNOR TO THE DOW CHEMICAL COMPANY, OF MIDLAND, MICHIGAN, A CORPORATION OF MICHIGAN

PURIFICATION OF BROMINE

Application filed June 25, 1930. Serial No. 463,676.

This invention relates to methods for purifying bromine from small amounts of chlorine which commonly occur in the crude product resulting from the usual processes for making bromine. For example, a well known commercial process consists in treating an aqueous solution containing a bromide with chlorine in order to liberate the bromine in the elemental state and then boiling or "steaming out" the bromine, which is condensed as liquid and separated from the aqueous distillate. An excess of chlorine is usually employed to insure liberation of all of the bromine, such excess chlorine of course accompanying the bromine when the latter is distilled out of the solution and constituting an impurity in the product. The usual method of purifying the bromine from such chlorine has been to treat the impure product with an aqueous solution of a bromide whereby the chlorine is removed by reacting with such bromide to liberate an equivalent amount of bromine, and the purified bromine is then separated from the aqueous solution. Due to the appreciable solubility of bromine in water and aqueous bromide solutions a considerable loss of bromine occurs in the above purification method by dissolving in the bromide solution, from which it must be recovered by further treatment.

I have now found that the crude bromine may be freed from the chlorine impurity contained therein by a simplified procedure which avoids the use of aqueous purifying solutions entirely. My improved method consists essentially in exposing the bromine in thin layers having a relatively extensive surface to a current of air, whereby the chlorine contained therein is caused to vaporize along with some of the bromine, and then fractionally condensing the bromine-chlorine vapor to separate liquid bromine therefrom while the chlorine is carried away substantially completely by the exit gases. The invention, then, consists of the steps hereinafter fully described and particularly pointed out in the claims, the annexed drawing and following description setting forth but a few of the various ways in which the principle of the invention may be used.

In said annexed drawing:—

The single figure is a diagrammatic representation of an apparatus layout suitable for carrying out the invention.

Referring to the drawing, crude bromine contained in a storage tank 1 flows through valved pipe 2, first, to a condenser coil 3 and thence to a vaporizer coil 4, coils 3 and 4 being made of suitable resistant material such as lead, glass or stoneware, and each coil submerged in water or other temperature regulating medium contained in tanks 5 and 6, respectively. Water may be admitted to tank 5 through valved inlet 7 and allowed to overflow through pipe 8 leading to tank 6, the discharge from the latter being taken off through outlet 9. An air inlet 10 is provided at the lower end of coil 4, and an air outlet 11 at the upper end of coil 3. Purified bromine is discharged from coil 4 through trapped discharge pipe 12 whence it is led to storage or otherwise disposed of. A heater 13 is shown surrounding a portion of pipe 8 to supply additional heat, if required, to the water flowing therethrough so as to maintain a suitable temperature in tank 6.

The liquid bromine flows by gravity in a thin stream through the series of coils in countercurrent to the current of air, the rate of introduction of crude bromine being so regulated in relation to the bore of the coils that flooding does not occur. A relatively large liquid surface is thus exposed which is constantly changed and renewed as the stream flows, thus facilitating vaporization of the liquid. The current of air constantly removes vapors as they are formed so as to maintain the rate of vaporization at or near the maximum for the temperature existing in the coils.

The temperature of the lower, or vaporizer, coil is to be maintained preferably somewhat above normal room temperature, e. g. at about 35° C., although a temperature range between about 20° and 50° C. is practically permissible at this stage. It is well to keep below the boiling point of bromine, e. g. 58.7° C., so as to avoid an unnecessary amount of vaporization thereof which would necessitate a larger condensing coil, while temperatures below about 20° C. are less suitable due to the increasing viscosity of liquid bromine which opposes the separation of chlorine vapor from the crude liquid. At temperatures between 20° and 50° C. the vapor pressure of chlorine varies from about 7 to 15 atmospheres whereas the vapor pressure of bromine varies only from about 170 to 600 millimeters. Consequently the tendency of chlorine to vaporize is from 20 to 30 times as strong as that of bromine, and substantially all of the chlorine present as impurity in the crude bromine may be vaporized while only a small fraction of the bromine is being vaporized.

The mixed vapors from the vaporizer coil rise up into the fractional condenser coil which is to be maintained at a lower temperature than that of the vaporizer coil. A temperature of about 25° C. has been found suitable, although a range of temperature between about 15° and 50° C. may be used, care being observed to maintain a differential of from about 5° to 15° C. below the temperature of the vaporizer coil. In the condenser coil some vaporization of chlorine and bromine takes place, but the principal action is one of fractional condensation whereby a portion of the bromine vapors are condensed and returned to the liquid stream, while substantially all of the chlorine vapor remains as such and passes out with the exit air. The chlorine and bromine content of such exit gases may be conveniently recovered by returning to the process for making crude bromine wherein bromine is liberated from a bromide-containing solution by reaction with chlorine.

As a specific example, an apparatus was employed similar to that illustrated in the drawing wherein the vaporizer coil and the condenser coil each consisted of a 1¼ inch internal diameter stoneware coil 80 feet in length. Crude liquid bromine, containing on an average 3.13 per cent chlorine, was passed through at the rate of 2000 pounds per 24 hours, and air was introduced under slight pressure at the rate of 2 cubic feet per minute, the air consumption accordingly being approximately 1½ cubic feet per pound crude bromine treated. The temperature of the vaporizer coil was maintained at approximately 35° C. and of the condenser coil at approximately 25° C. The amount of purified bromine recovered was approximately 1600 pounds. On repeated runs the chlorine content of the purified product varied from 0.04 to 0.40 per cent, the average being 0.25 per cent. By operating at a somewhat slower rate, or by lengthening the condenser coil, or by other slight modifications of the apparatus that will be readily apparent to those versed in the art, the chlorine content of the purified bromine may be reduced to practically nil. Likewise, by maintaining the fractional condenser at a lower temperature than 25° C. a somewhat larger yield of purified bromine is obtainable, and less bromine is carried away with the exit gases to be returned to the bromine extraction process. However, a temperature of about 25° C. is convenient for practical operation, being readily attainable with natural cooling means, and requires no artificial refrigeration.

Neither the dimensions for the coils nor the ratio of diameter to length thereof given in the foregoing example are to be regarded as implying any limitation upon the invention, inasmuch as a wide variation is permissible depending upon the capacity of apparatus, temperature, degree of purification desired and other factors. Likewise, other forms of apparatus than that specifically described herein may be used which are adapted for contacting a liquid such as bromine with a current of air or other suitable gas unreactive therewith under the conditions for carrying out the purification by means of air-fractionation, as described. For instance, the vaporizer may consist of a packed scrubber tower in which the bromine flows in distributed manner in countercurrent to an ascending current of air, or, again, air may simply be blown or bubbled through a body of liquid bromine, the vapors in either case then being subjected to fractional condensation.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of purifying liquid bromine containing a relatively small amount of chlorine which comprises partially vaporizing such bromine at a temperature materially below the boiling point thereof, contacting the liquid with a slow current of air to remove the vapors evolved, cooling the vapor-laden air to condense at least a portion of the bromine therein, and separating the residual gases containing the chlorine.

2. The method of purifying liquid bromine containing a relatively small amount of chlorine which comprises partially vaporizing such bromine at a temperature between about 20° and about 55° C., contacting the liquid with a slow current of air to remove the vapors evolved, cooling the vapor-laden air under fractionating conditions to condense at least a portion of the bromine therein, and separating the residual gases containing the chlorine.

3. The method of purifying liquid bromine containing a relatively small amount of chlorine which comprises causing a stream of such impure bromine of a temperature materially below its boiling point to flow in countercurrent relation to a slow current of air in direct contact therewith, whereby the bromine is partially vaporized and the vapors are removed by the air current, cooling the vapor-laden air to condense at least a portion of the bromine therein and separating the residual gases containing the chlorine.

4. The method of purifying liquid bromine containing a relatively small amount of chlorine which comprises causing a stream of such impure bromine to flow first through a condensing zone and then through a vaporizing zone in countercurrent relation to a slow current of air in direct contact therewith, maintaining said vaporizing zone at a temperature between about 20° and about 55° C., whereby the bromine is partially vaporized, maintaining said condensing zone at a lower temperature, whereby a portion of the bromine vapors first evolved is condensed under fractionating conditions, and separating the residual gases containing the chlorine.

Signed by me this 20th day of June, 1930.

GRAYTON F. DRESSEL.